Sept. 10, 1940.  K. DANIEL  2,214,406

METHOD OF DUPLICATING ENDLESS BAND SOUND CARRIERS

Filed Jan. 7, 1938

Inventor:
Karl Daniel
by S. Sokal,
Attorney.

Patented Sept. 10, 1940

2,214,406

UNITED STATES PATENT OFFICE 2,214,406

METHOD OF DUPLICATING ENDLESS BAND SOUND CARRIERS

Karl Daniel, Cologne-Sulz, Germany, assignor to Tefi-Apparatebau Dr. Daniel K.-G., Cologne, Germany Application January 7, 1938, Serial No. 183,920
In Germany January 11, 1937

4 Claims. (Cl. 18—48.3)

This invention relates to an improved method for duplicating endless band sound carriers, especially those having thereon sound tracks produced by the needle sound recording method. A method of duplicating plate-like sound carriers having thereon needle sound recordings is known in which the copies are prepared with the aid of a matrix produced from the original recording.

The known method cannot, however, be directly applied to the duplicating of endless band sound carriers, particularly long sound-carrying bands, which are wound into a coil, as the production of an endless matrix and, moreover, the preparation of copies from this endless matrix presents considerable difficulties in practice.

One object of this invention is to overcome the above disadvantage and enable duplicators to be prepared by the use of a matrix in a simple manner.

Another object of the invention is to provide a method of manufacturing a matrix suitable for such a purpose.

A still further object of the invention is to provide a method of preparing endless band copies of an endless band original by the use of such a matrix.

The above and other objects of the invention will be apparent from the following further description.

In order that the invention may be fully understood, I shall now describe one embodiment thereof, by way of example, by reference to the accompanying diagrammatic drawing.

Figure 1:
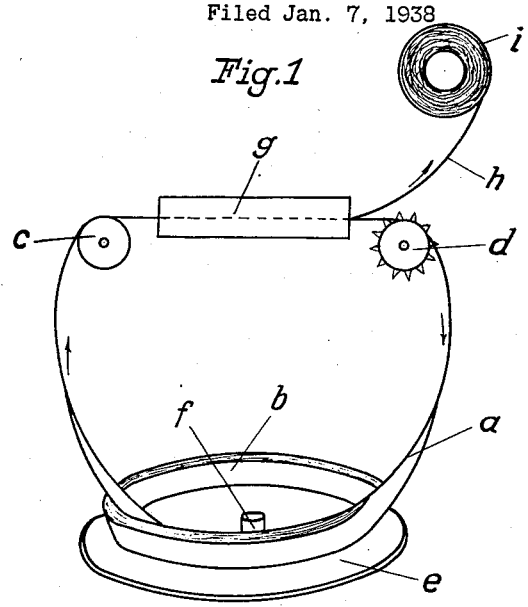
Fig. 1 illustrates the manner in which the matrix is prepared.

Referring first to Fig. 1, the endless sound carrier band $a$ is drawn out in a loop from its coil $b$ and is guided over a guide wheel $c$ and a driving wheel $d$ the teeth of which engage in the perforations formed in the band. The coil $b$ rests on a horizontal plate $e$ which is rotatable around a vertical axis $f$. Between the guide wheel $c$ and the driving wheel $d$ is disposed a galvanic bath $g$ or another suitable device for producing a deposit on the sound carrier band when the latter passes therethrough.

The sound carrier band $a$ is driven through the galvanic bath $g$ in the direction of the arrow (Fig. 1) by the driving wheel $d$. In the said bath $g$ a galvanic covering, which forms the matrix, is formed on the sound carrier band and issues with the band from the bath. As the band $a$ leaves the bath, the matrix is detached or separated therefrom and is wound on a drum $i$ in the form of an open-ended band $h$. The operation is completed with a single revolution of the sound carrier band $a$.

Figure 2:
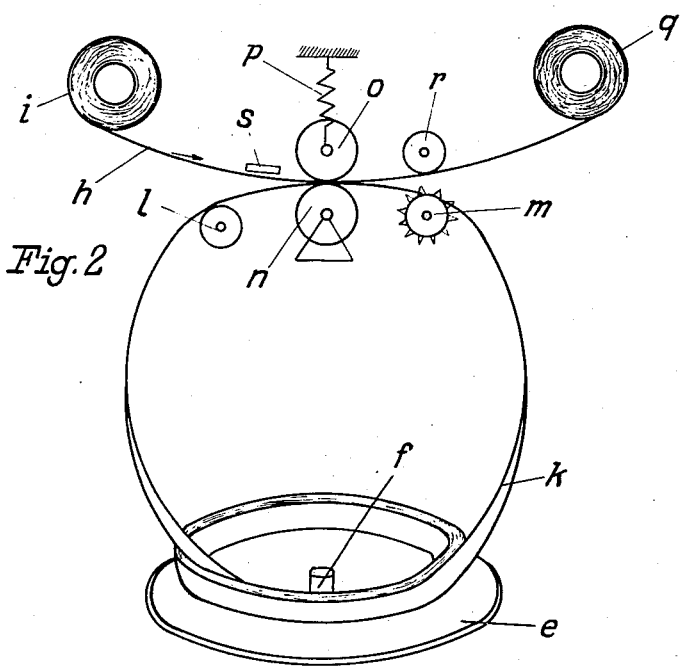
Fig. 2 illustrates the preparation of a copy therefrom.

Referring now to Fig. 2, in order to prepare copies from this matrix, an endless band $k$ carried, in the same manner as the original sound carrier band $a$, on a rotatable plate $e$, and preferably consisting of the same material as the said band $a$, is drawn in the direction of the arrow (Fig. 2) over the guide roller $l$ on the driving roller $m$ between two rollers $n$ and $o$ which are pressed together by means of a spring $p$. The matrix $h$ is unwound from the drum $i$ on to the drum $q$. It is likewise drawn by means of a driving wheel $r$, which is coupled with the driving wheel $m$, at the same speed as the band $k$ between the rollers $n$ and $o$ so that at this point the matrix is pressed tightly on to the band $k$. By heating the roller $o$ or, if desired, both the rollers $o$ and $n$, the matrix $h$ is heated as it passes through the rollers so that the raised sound tracks present on the matrix are pressed into the endless band $k$. If the heating of the matrix $h$ by the rollers $o$ and $n$ should not be sufficient, an additional heating device $s$ can also be provided. During a single revolution of the band $k$, the matrix $h$ is also run off from one drum to the other and the process is thereby completed. Any gaps at the beginning and end position which may exist between the sound tracks on the band $k$, which gaps may arise owing to the slight differences in length between the band $k$ and the matrix $h$ which may occur in practice, can be advantageously removed by hand by connecting up the opposing ends of the sound tracks by means of a scalpel or other suitable tool.

The improved method in accordance with this invention can also advantageously be used with endless band sound carriers, the ends of which are secured together after being turned through 180° the sound tracks having thereby been arranged on both sides of the said band. In this case, of course, the sound carrier must carry out two revolutions and the matrix is double the length of the sound carrier and is naturally provided with sound tracks only on one side thereof. If the endless band serving for the duplicating is likewise to receive sound tracks on both sides, then the latter must also be secured together with its ends turned through 180° with respect to one another whereby the recordings on the matrix are likewise pressed into the endless band $k$ on both sides thereof. In this case also, the endless band is made only half the length of the matrix.

The production of light sound copies of the original sound carrier can be effected in a similar manner. In this case both the galvanic bath or chamber g of Fig. 1 and also the heating rollers o, n of Fig. 2 are replaced by a copying device.

I claim:

1. The method of producing endless band sound carriers having a sound track which is longer than the length of the carrier so that a plurality of grooves is present at a cross-section of the sound carrier, which comprises preparing an open-ended matrix of a length equivalent to the length of the surface of an endless sound carrier blank and having a plurality of ribs corresponding to the sound track to be formed, pressing one portion of said endless sound carrier blank into contact with the matrix for forming a portion of the sound track in said carrier blank, the major portion of the sound carrier blank being wound as a spiral coil with the inner and outer parts of the spiral coil connected by a loop including said portion in contact with the matrix, progressively withdrawing the sound carrier blank from the coil and pressing it into contact with corresponding successive portions of the matrix, advancing the impressed carrier and matrix and progressively stripping the matrix from the endless sound carrier, and rewinding the sound carrier onto the spiral coil.

2. The method of producing endless band sound carriers having a sound track which is longer than the length of the carrier and extends continuously along both faces of the carrier, which comprises preparing an open-ended matrix of a length equivalent to the combined length of the two faces of an endless sound carrier blank and having a plurality of ribs corresponding to the sound track to be formed, pressing one portion of said endless sound carrier blank into contact with the matrix for forming a portion of the sound track in said carrier blank, the major portion of the sound carrier blank being wound as a spiral coil with the inner and outer parts of the spiral coil connected by a loop including said portion in contact with the matrix, said loop including a portion in which the endless carrier has been turned through 180 degrees whereby the opposite faces of the carrier provide a single continuous surface, progressively withdrawing the sound carrier blank from the coil and pressing it into contact with corresponding successive portions of the matrix, advancing the impressed sound carrier and matrix and progressively stripping the matrix from the endless sound carrier, and rewinding the sound carrier onto the spiral coil.

3. The method of producing endless band sound carriers having a sound track which is longer than the length of the carrier and extends continuously along both faces of the carrier, which comprises preparing an open-ended matrix of a length equivalent to twice the length of an endless sound carrier blank and having a plurality of ribs corresponding to the sound track to be formed, pressing one portion of said endless sound carrier blank into contact with the matrix for forming a portion of the sound track, the major portion of the sound carrier blank being wound as a spiral coil with the inner and outer parts of the spiral coil connected by a loop including said portion in contact with the matrix, said loop including a portion in which the endless carrier has been turned through 180 degrees whereby the opposite faces of the sound carrier provide a single continuous surface, progressively withdrawing the sound carrier blank from the coil and pressing it into contact with corresponding successive portions of the matrix, advancing the impressed sound carrier and matrix and progressively stripping the matrix from the endless sound carrier, and rewinding the sound carrier onto the spiral coil.

4. The method of producing endless band sound carriers having a sound track which is longer than the length of the carrier so that a plurality of grooves is present at a cross-section of the sound carrier, which comprises preparing an open-ended matrix of a length equivalent to twice the length of one face of a sound carrier blank and having a plurality of ribs corresponding to the sound track to be formed, said sound carrier blank being arranged in a coil, pressing one portion of said endless sound carrier blank into contact with the matrix for forming a portion of the sound track in said carrier blank, progressively withdrawing the sound carrier blank from the coil and pressing it into contact with corresponding successive portions of the matrix, advancing the impressed sound carrier and matrix and progressively stripping the matrix from the endless sound carrier, and forming the sound carrier into a spiral coil having the inner and outer parts of the spiral connected by a loop, said loop including a portion in which the sound carrier has been turned through 180 degrees whereby the opposite faces of the sound carrier provide a single continuous surface.

KARL DANIEL.